United States Patent [19]

Wattron

[11] 4,299,077
[45] Nov. 10, 1981

[54] ROTARY-SCYTHE MOWER WITH CUTTER DISCS

[75] Inventor: Albert Wattron, Schwenheim, France

[73] Assignee: Belrecolt S.A., Marmoutier, France

[21] Appl. No.: 81,855

[22] Filed: Oct. 4, 1979

[30] Foreign Application Priority Data

Oct. 11, 1978 [FR] France .............................. 78 29465

[51] Int. Cl.³ .................... A01D 55/262; A01D 55/18
[52] U.S. Cl. ........................................ 56/13.6; 56/6; 56/11.9
[58] Field of Search ...................... 56/13.6, 13.7, 11.9, 56/13.5, 249, 6

[56] References Cited

U.S. PATENT DOCUMENTS

| | | | |
|---|---|---|---|
| 2,811,003 | 10/1957 | Getz | 56/192 |
| 2,972,158 | 2/1961 | Lindstrom | 56/13.6 |
| 2,976,663 | 3/1961 | Smith et al. | 56/11.9 |
| 3,507,102 | 4/1970 | Klue et al. | 56/13.6 |
| 3,685,265 | 8/1972 | Horowitz | 56/249 |
| 3,841,069 | 10/1974 | Weck | 56/11.9 |
| 3,857,225 | 12/1974 | Knudson | 56/13.6 |
| 4,103,476 | 8/1978 | Oosterling et al. | 56/13.6 |
| 4,157,004 | 6/1979 | van der Lely | 56/13.6 |
| 4,197,692 | 4/1980 | Wabar | 56/13.6 |

FOREIGN PATENT DOCUMENTS

| | | | |
|---|---|---|---|
| 2104564 | 8/1971 | Fed. Rep. of Germany | 56/13.6 |
| 2263453 | 11/1975 | France | 56/13.6 |
| 2294625 | 7/1976 | France | 56/13.6 |

Primary Examiner—Paul J. Hirsch
Attorney, Agent, or Firm—Young & Thompson

[57] ABSTRACT

A mower comprises cutter blades mounted by bolts in bushes on cutter discs surmounted by hollow elements secured on respective shafts. Accommodated within or partially within the hollow elements are drive means including hydraulic motors, drive shafts, bevel gear wheels and a toothed wheel meshing with a toothed wheel. A splined shaft extends through the toothed wheels to synchronize the rotations of the cutter discs. A casing encloses the shaft and is provided with renewable sole pieces which slide on the ground.

6 Claims, 6 Drawing Figures

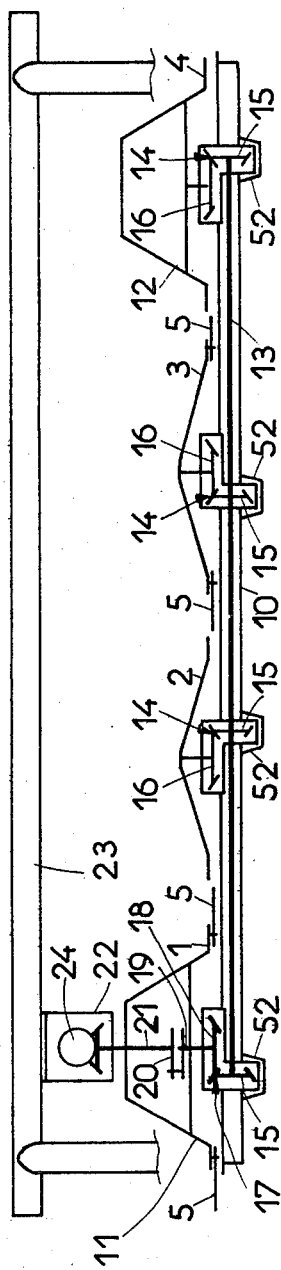
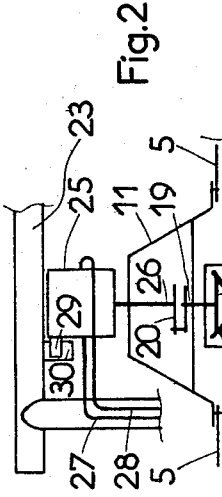
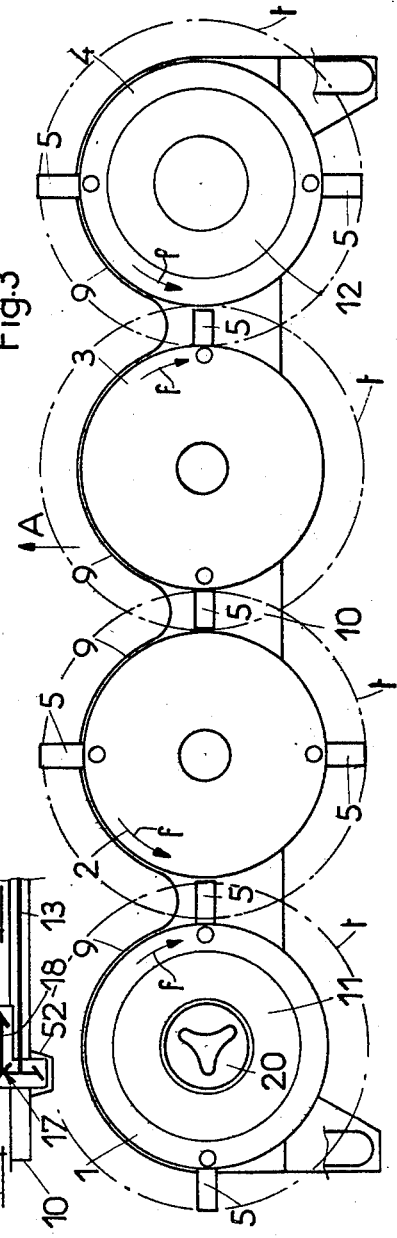

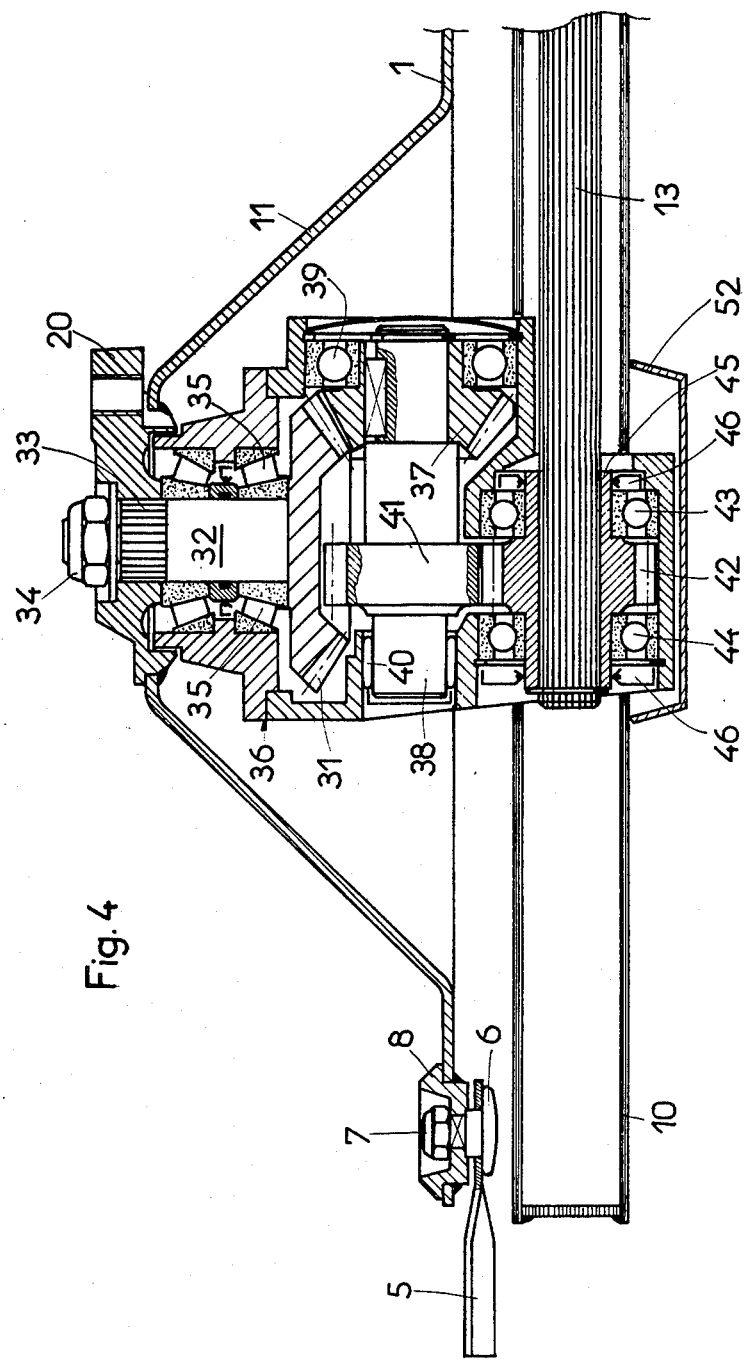

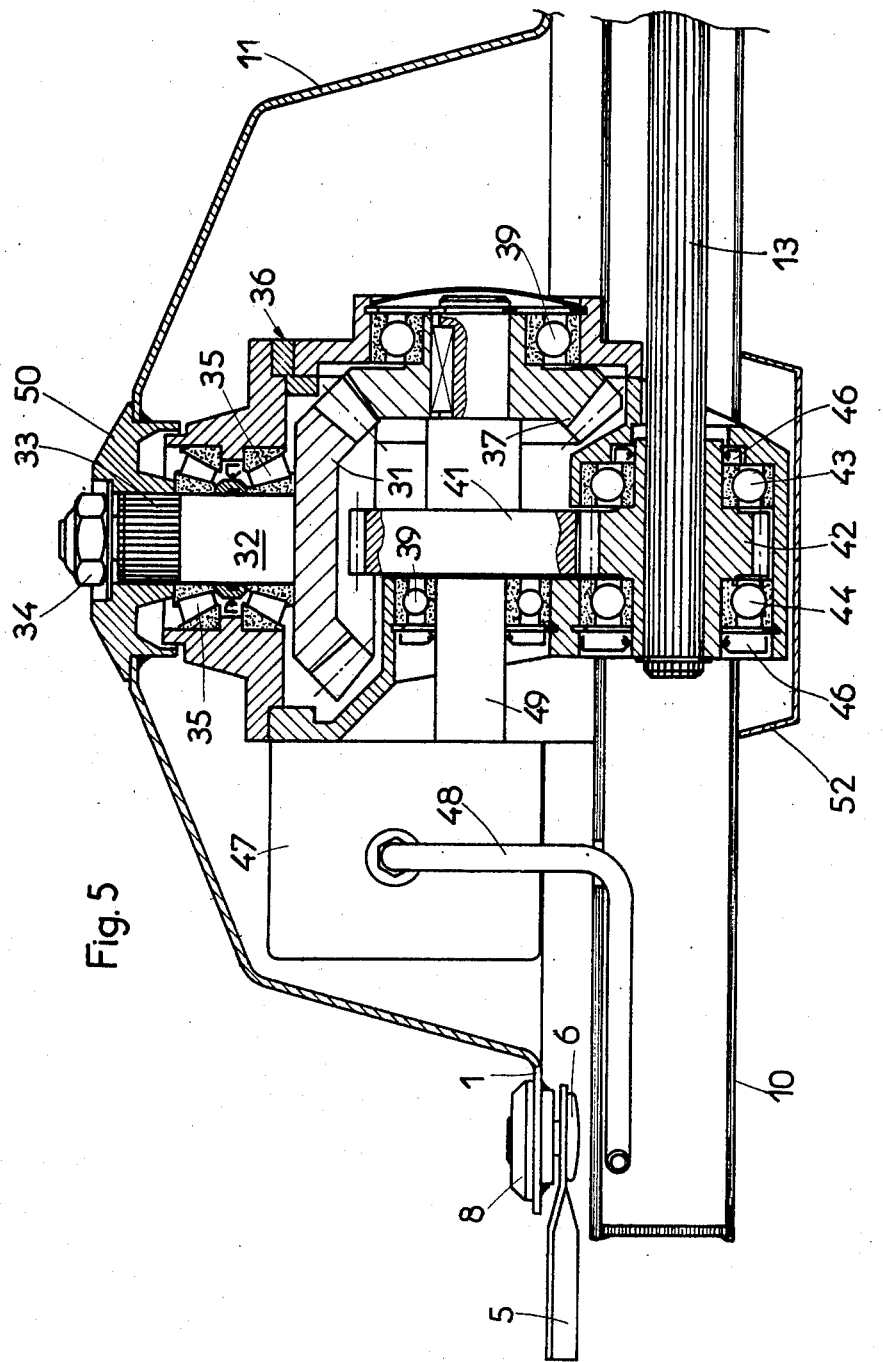

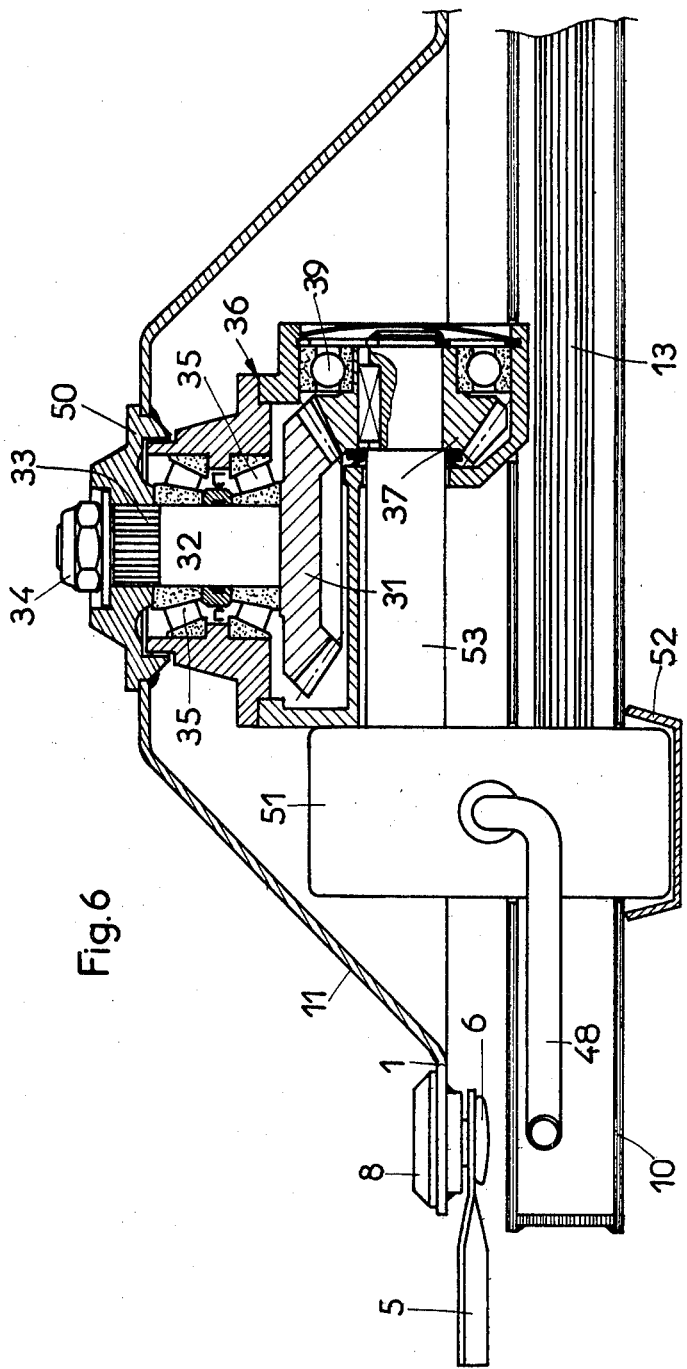

ROTARY-SCYTHE MOWER WITH CUTTER DISCS

INTRODUCTION AND BACKGROUND OF THE INVENTION

The present invention relates to mowers having discs driven from beneath by means of at least one transmission shaft extending beneath the discs, in the housing of such a mower. By transmission shaft there is here generally understood any transmission shaft made in one or more parts, whether or not extending in alignment with one another, being interconnected by coupling elements such as Cardan joints, sockets, gear wheels, etc. Each abovementioned transmission shaft operates one of the elements of a certain number of bevel gearings of which the other element is connected to one of the discs of the mower.

This type of machine is very simple in concept and possesses great ease of maintenance and great flexibility in use. In fact the mentioned bevel gearings are lodged in sealed gear boxes which are very easily removable after withdrawal of the said transmission shaft. These gear boxes can thus be easily exchanged in the case of accident or can be reversed through 180° about the rotation axis of their disc in order to obtain a reversal of their direction of rotation for example.

the driving of the above-mentioned transmission shaft is effected on mowers of known type by means of a gear box situated at the extremity of the housing of the mower. Therefore the cutting width of these mowers is less than their total width, which under certain circumstances is not helpful to the cutting of the fodder, especially when the machine is hitched to the front of a tractor or when several machines are coupled together. In fact there is risk of a part of the housing of such a machine passing over the fodder without cutting it. Without losing the above-stated advantages, the present invention permits of remedying this drawback by proposing a machine of simple concept, of low cost and which possesses a special drive device permitting it to have a cutting width substantially equal to its overall width.

BRIEF SUMMARY OF THE INVENTION

Such a machine is essentially cnaracterised in that it comprises at least one drive device lodged at least partially within a hollow element for example in the form of a disc or frusto-conical element fast with one of the discs of the mower, the said device being on the one hand connected to one of the said discs and on the other connected to a shaft extending over substantially the whole length of the housing of the mower, within this housing, the said shaft being moreover connected to the other discs of the

FURTHER DESCRIPTION AND ADVANTAGES OF THE INVENTION

Such an arrangement is very advantageous since without complicating the structure of mowers having discs driven from beneath by a transmission shaft, it permits the use of this kind of machine especially as front-acting mower or as mower-conditioner, the cutting width of which is equal to the total width, by virtue of a direct drive by one of the discs of the mower.

According to another characteristic of the invention an intermediate shaft is disposed between a bevel gearing receiving the power necessary for the drive of the discs of the mower and the transmissin shaft extending over the whole length of its housing. The connection between this intermediate shaft and the transmissin shaft, which are advantageously mutually parallel, is effected by means of toothed wheels which are preferably spur gears.

This arrangement possesses the advantage that the bevel gearing receiving the power necessary for the drive of the discs is no longer lodged in the housing of the mower extending beneath the discs. In fact the said bevel gearing can be lodged within the frusto-conical element.

Thus it is possible to increase the modulus of the bevel gearing, that is its strength and thus its size without any repercussion upon the depth of the housing of the mower, whereas in mowers of known type is necessary to find a compromise between the strenth of these bevel gearings and their size since these are lodged in the housing of the mower which must be as flat as possible to permit of cutting the fodder close to the ground and in uniform manner.

According to the present invention the transmission shaft is driven by spur gears one of which is keyed on the intermediate shaft while the other, which has the largest possible diameter in view of the reduced thickness of the housing of the mower, is keyed on the transmission shaft. The use of toothed spur gears permits of increasing their thickness and thus their strength and the transmittable torque without this increase of dimension having repercussions upon the thickness of said housing.

According to a further interesting characteristic of the mower according to the invention, its drive device can be operated by at least one hydraulic motor lodged in the frusto-conical element of the said mower or beneath at least one of its discs. The axes of these hydraulic motors can be either perpendicular or parallel to the transmission shaft of the mower.

The placing of these motors permits of maximum reduction of the risks of fodder hooking itself to the drive device of the discs of the machine. Moreover according to an interesting variant of the invention the said toothed wheels, a spur-gear type for example, can themselves constitute the rotary elements of a gear pump operating as motor, for the purpose of drive of the discs of the mower.

BRIEF DESCRIPTION OF THE VIEWS IN THE DRAWINGS

The invention will be explained in greater detail herinafter, with further characteristics and advantages, in the following non-limitative description of examples of embodiment of the invention given with reference to the accompanying drawings, wherein:

FIG. 1 represents diagrammatically a front view in longitudinal section along the line I—I in FIG. 3 of a mower according to the invention, the discs of which are driven through one of them with the aid of a mechanical device, FIG. 2 represents a partial view of a variant of embodiment of FIG. 1 in which the discs are driven with the aid of a hydraulic device, FIG. 3 represents diagrammatically a plan view of a mower according to the invention.

FIG. 4 represents in detail a partial view along the line I—I in FIG. 3 of a variant of embodiment of the invention in which the discs of the mower are driven mechanically or hydraulically with the aid of an intermediate shaft, FIG. 5 represents in detail a partial section along the line I—I in FIG. 3 of a variant of embodiment of the invention in which the discs of the mower are driven by a hydraulic motor and an intermediate shaft, both being lodged beneath one of the said discs, FIG. 6 represents in detail a partial section along the line I—I in FIG. 3 of a variant of embodiment of the invention in which each disc of the mower is driven by its own hydraulic motor, the said discs being moreover mechanically interconnected.

DETAILED DESCRIPTION OF THE PREFERRED EMBODIMENTS

In the drawings, as represented in FIGS. 1, 2 and 3, the mower according to the invention comprises four discs 1, 2, 3 and 4 of circular form each equipped with two blades 5 disposed on the edges of the said discs diametrically oppositely. Without departing from the scope of the invention, the form of the discs 1 to 4 can likewise be oval Each blade 5 is fixed to the discs 1 to 4 by means of a screw 6 and a nut 7 sunk into a dished washer 8 (FIG. 4). Each blade 5 is moreover freely articulated about the axis of its fixing screw 6 so that it can extend radially outwards under the action of centrifugal force on rotation of the discs 1 to 4 in the direction of the arrows f. By reason of its articulation it is possible for each blade 5 to retract to the rear on encountering an obstacle.

In order to protect the discs 1 to 4, these are bordered at the front by circular sectors 9 the diameter of which is slightly greater than that of the discs 1 to 4 than that of their rotary path, the said diameter being however less than the diameter of the rotary path t of the blades 5.

The discs 1 to 4 extend above a housing 10 connected to a hitch device (not shown) permitting attachment of the mower to a tractor for its utilisation, during which the said mower is moved in the direction of the arrow A.

The end discs 1 and 4 are respectively surmounted by a hollow frusto-conical element 11 and 12. These elements 11 and 12 are especially intended in mowing to ensure a clean separation of the cut fodder from that still standing. Thus it is possible to create a passage for the wheels of the tractor which are in no danger of rolling over cut fodder.

In FIG. 1 it can be seen that the discs 2 to 4 are driven by means of a shaft 13 for example made in a single piece. This shaft 13 drives three bevel gearings 14 each comprising a pinion 15 keyed on the said shaft 13 and a wheel 16 connected to one of the discs 2, 3 and 4 respectively.

The arrangement of the elements 15 and 16 in each bevel gearing 14 is such that it permits the rotating drive of the discs 2, 3 and 4 in the directions indicated by the arrows f (FIG. 3). The shaft 13 permitting of driving the discs 2 to 4 is itself driven by a bevel gearing 17 the wheel 18 of which is keyed on a shaft 19 extending vertically upwards on the axis of the frusto-conical element 11 This shaft 19 is equipped with a coupling device 20 permitting its connection to the output shaft 21 of a gear box 22 fixed to the support beam 23 of the guard (not shown) of the mower. The gear box 22 contains a bevel gearing 24 the elements of which are respectively connected to the output shaft 21 and to an input shaft. A grooved pulley driven in known manner with the aid of belts from the power take-off of the tractor is keyed on this input shaft.

FIG. 2 represents a partial view of a mower similar to that in FIG. 1. In FIG. 2 the drive of the discs 1 to 4 is effected by means of a hydraulic motor 25 the shaft 26 of which is connected to the coupling device 20 lodged in the frusto-conical element 11. In order to effect its halting in rotation the hydraulic motor 25, supplied by pipes 27 and 28 and possibly extending at least partially within the said element 11, possesses a stop 29 which comes to press against a detent 30 provided on the support beam 23. The said motor 25 can likewise be rigidly fixed to the beam 23 while being connected to the shaft 19 by means of a coupling device 20 which must then be of the floating type.

The two variants of embodiment as described above possesses the advantage of effecting the drive of the discs 1 to 4 through one of them, which permits the mower thus designed to possess a total width substantially equal to its cutting width. The drive device of each of the discs is moreover very simple in so far as it comprises a shaft the rotation of which drives a certain number of bevel gearings respectively associated each with one of the discs of the mower.

FIG. 4 represents an improved variant of embodiment of the invention comprising a certain number of elements in common with those described with reference to FIGS. 1 to 3, the said elements bearing the same references and not being described afresh in detail.

According to this variant a bevel wheel 31 and its vertical shaft 32 are connected by means of splines 33 and a nut 34 to the coupling device 20 fast with the frusto-conical element 11, and the disc 1. The shaft 32 is guided by roller bearings 35 mounted in a housing 36 extending entirely beneath the cone frustum 11.

The bevel wheel 31 meshes with a bevel pinion 37 keyed on an intermediate shaft 38 guided at its extremities by ball bearings 39 and needle bearings 40. The shaft 38 which is perpendicular to the shaft 32, is equipped with a toothed wheel 41 extending substantially in the axis of the shaft 32. This toothed wheel 41 meshes with a pinion 42 situated beneath the wheel 41 and guided by ball bearings 43 and 44 extending on either side of its toothing, which according to the invention can be a spur or helical toothing or possess any other form. This pinion 42 is mounted on the transmission shaft 13 which extends in the housing 10 of the mower, parallel with the intermediate shaft 38. The pinion 42 is associated with a sheath 45. Upon the latter, which extends over the whole length of the lower part of the housing 36, there are mounted bearings 43 and 44 and seal devices 46. Thus it is possible to withdraw the splined end of the shaft 13 from the sheath 45 without the lubricant contained in the housing 36 excaping therefrom.

The device according to the variant as represented in FIG. 4 operates in the following manner. By virtue of its coupling device 20 it is possible to connect it either to a gear box as described with reference to FIG. 1, or to a hydraulic motor as described with reference to FIG. 2. When a rotating movement is communicated to the device 20, the latter drives the frusto-conical element 11 and the disc 1 fast with said element 11. The coupling device 20 is connected rigidly to the shaft 32 and to its bevel wheel 31 which drives the pinion 37 at a predetermined speed. This rotation speed is communicated by means of the intermediate shaft 38 to the wheel 41 and then to the pinion 42 which drives the shaft 13 disposed parallel with the said shaft 38.

The advantage of the variant as described above consists in the fact that the bevel gearing 31, 37 which must be able to transmit the whole power absorbed by the machine is placed beneath frusto-conical element 11 where it can occupy all the space necessary according to the strength which it must possess. This is not the case in the variant as represented in FIGS. 1 and 2, where the said bevel gearing must be simultaneously of reduced size and of great strength. According to the variant in FIG. 4 the fact of provision of a pair of spur gears 41, 42 subsequent to the bevel gearing 31, 37 permits of reducing the diameter of the pinion 42 without reduction of the strength of its toothing in so far as it is possible to widen the said toothing without detriment to the depth of the housing 10. This increase of dimension is in fact impossible when the transmission shaft 13 is directly driven by a bevel gearing, since the increase of the dimension of the toothing of bevel gears involves an increase of their diameter.

The problem of the compromise between the strength and dimensions of the bevel gears 14 serving to drive the discs 2 to 4 is less delicate since these bevel gearings 14 respectively transmit only the power necessary for the drive of one disc 2, 3 or 4.

FIG. 5 represents a supplementary variant of embodiment of the invention in which the elements already described in detail above carry the same references as those in FIGS. 1 to 4. According to this variant a hydraulic motor 47 is entirely lodged beneath the frusto-conical element 11. The said motor 47, supplied through a conduit 48, possesses an output shaft 49 on which there is mounted the wheel 41 meshing with the pinion 42. The axis of the said shaft 49 is parallel with the axis of the transmission shaft 13, being on the one hand connected to the said shaft and on the other connected to the bevel gearing 31, 37. The other parts of the kinematic chain of the variant in this FIG. 5 are identical with those of the kinematic chain as described with reference to FIG. 4, so that they will not be described afresh in detail. Only the coupling device 20 is eliminated, the shaft 32 being mounted in a socket 50 fast with the frusto-conical element 11.

On rotation of the hydraulic motor 47 the power available on the shaft 49 is absorbed on the one part by the bevel gearing 31, 37 for the purpose of driving the frusto-conical element 11 and the disc 1, and on the other part by the pair of spur gears 41, 42 for the purpose of driving the shaft 13 intended to drive the discs 2 to 4 with the aid of the bevel gearings 14. This variant permits of complete disengagement of the upper part of the frusto-conical element 11. Moreover drive by a hydraulic motor permits to a certail extent of absorbing operating jerks of the machine. Finally the presence of a single hydraulic motor and a mechanical connection between the discs 1 to 4 permits of retaining synchronous drive of the discs 1 to 4, which is necessary to avoid a collision of the blades 5 which are staggered by 90° from one disc to the next and the rotary paths of which, situated in one and the same plane, intersect, as may be seen from FIG. 3.

A last variant of embodiment of the invention is represented in FIG. 6. This variant possesses numerous elements similar to those represented in FIGS. 4 and 5, so that they will not be described afresh in detail.

According to this variant the gear wheels 41 and 42 as represented in FIGS. 4 and 5, the diameters of which are different, constitute the elements of a gear pump 51 supplied by a conduit 48 so as to operate as motor and to drive a shaft 53 on which the pinion 37 is keyed. The latter drives the bevel wheel 31 directly connected to the frusto-conical element 11 and to the disc 1. The hydraulic motor 51, which possesses a second output, is moreover connected to the transmission shaft 13.

In this example of embodiment each disc 1 to 4 is equipped with a hydraulic motor 51 which drives its disc 1 to 4 respectively by means of bevel gearing similar to the bevel 31, 37. The said hydraulic motors 51 are however moreover mechanically interconnected with the aid of the shaft 13, in order to preserve a synchronous drive of the discs 1 to 4. In the variant according to FIG. 6 the shaft 13 no longer has a transmission function but solely a function intended to preserve the synchronisation of the rotating movements of the discs.

Within the scope of the present invention these hydraulic motors 51 may likewise comprise not two gear wheels corresponding to the gear wheels 41 and 42, but three gear wheels, which permits for example of driving the shafts 13 and 53 in the same direction.

In FIG. 6 it can be seen that the hydraulic motor 51 is entirely situated beneath the frusto-conical element 11 and that it is situated on the left side of the axis of the shaft 32.

Without departing from the scope of the invention, the said hydraulic motor 51 can also be situated on the axis of the shaft 53, that is to say directly beneath the bevel wheel 31. Thus the sole piece 52 which permits the mower to slide over the ground can equally be situated axially of the discs 1 to 4, as is the case in FIGS. 1 to 5.

It is quite apparent that various improvements, modifications or additions may also be made to the examples of embodiment as described above, without thereby departing from the scope of the present invention.

What is claimed is:

1. In a rotary mower comprising a plurality of horizontal cutter discs mounted side by side for rotation about vertical axes, a horizontal transmission shaft extending between and below the discs; the improvement comprising a hollow element secured to one of the discs, and drive means disposed at least partially in said hollow element, said drive means including an intermediate shaft disposed higher than and parallel to said transmission shaft, gearing interconnecting said shafts, and bevel gearing interconnecting said intermediate shaft and said disc to convert rotary movement of said intermediate shaft about a horizontal axis into rotary movement of said disc about a vertical axis.

2. A rotary mower as claimed in claim 1, in which said drive means is a hydraulic motor drivingly connected to said intermediate shaft.

3. In a rotary mower comprising a plurality of horizontal cutter discs mounted side by side for rotation about vertical axes, a horizontal transmission shaft extending between and below the discs; the improvement comprising a hollow element secured to one of the discs, and drive means disposed at least partially in said hollow element and connected to said transmission shaft, said drive means including an intermediate shaft parallel to and higher than said transmission shaft, bevel gearing interconnecting said intermediate shaft and said disc, and a hydraulic motor disposed within said hollow element for driving said intermediate shaft.

4. A rotary mower as claimed in claim 3, said hydraulic motor also rotatably driving said transmission shaft.

5. In a rotary mower comprising a plurality of horizontal cutter discs mounted side by side for rotation about vertical axes, a horizontal transmission shaft extending between and below the discs; the improvement comprising, for each said disc, an intermediate shaft disposed higher than and parallel to said transmission shaft, gears on said transmission shaft meshing with a gear on each said intermediate shaft, and a bevel gear on each said intermediate shaft meshing with a bevel gear fast with a said disc.

6. A rotary mower as claimed in claim 5, said gears on said transmission shaft being smaller than the gears with which it meshes on said intermediate shafts.

* * * * *